C. W. SNYDER.
TANK INLET VALVE.
APPLICATION FILED APR. 13, 1917.
1,266,637.
Patented May 21, 1918.
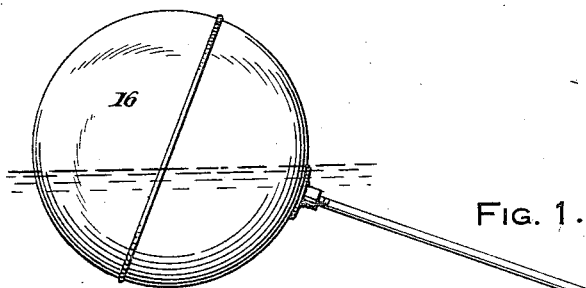
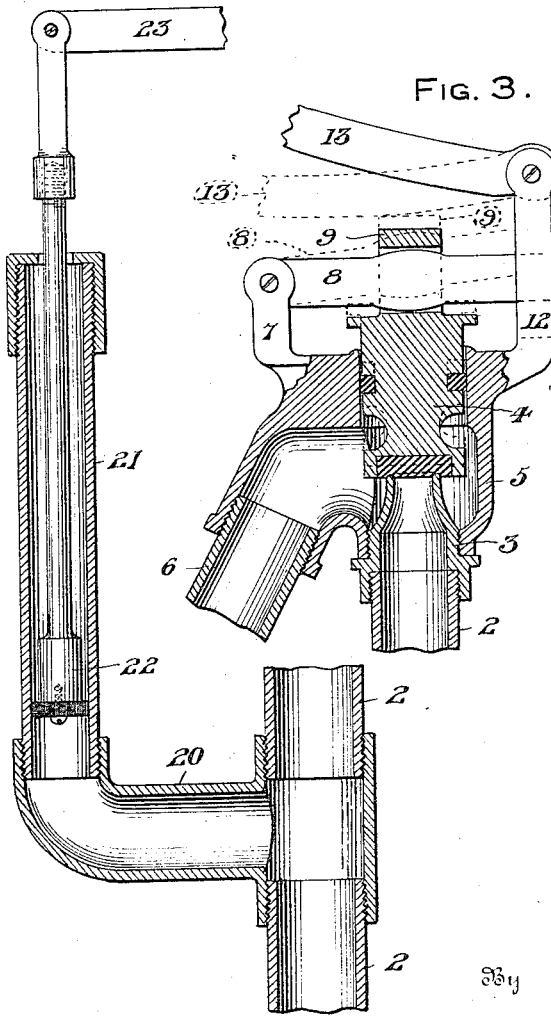
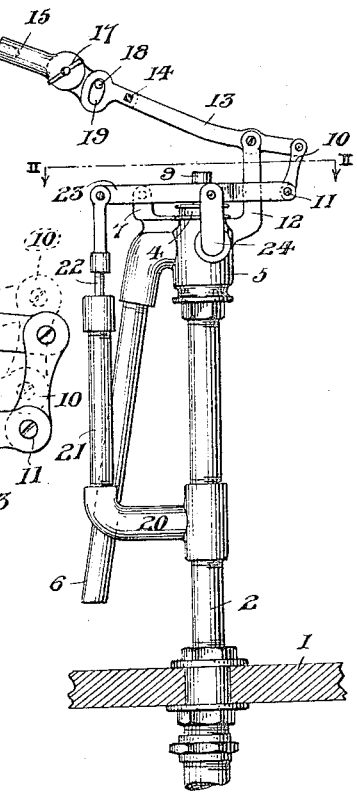

UNITED STATES PATENT OFFICE.

CHARLES W. SNYDER, OF ALTOONA, PENNSYLVANIA.

TANK INLET-VALVE.

1,266,637.  Specification of Letters Patent.  Patented May 21, 1918.

Application filed April 13, 1917. Serial No. 161,804.

*To all whom it may concern:*

Be it known that I, CHARLES W. SNYDER, a citizen of the United States, residing at Altoona, in the county of Blair and State of Pennsylvania, have invented new and useful Improvements in Tank Inlet-Valves, of which the following is a specification.

My invention relates to a tank inlet valve and has as its principal object the provision of an inlet valve mechanism for closet cisterns and the like which shall be automatic and noiseless in its action.

A second object of my invention is to provide an automatic inlet valve which shall be firmly held against its seat at all times except when the water in the tank or cistern has fallen a predetermined amount.

A third object of my invention is to provide an automatic inlet valve mechanism which shall be positively and quickly operative at the predetermined limit of water level in order to avoid all leakage in small quantities over the valve seat.

A final object of the invention resides in the particular arrangement and combination of parts hereinafter described.

In the accompanying drawing:—

Figure 1 is an elevational view of a mechanism embodying my invention, a portion only of the tank or cistern being shown.

Fig. 2 is a sectional plan view taken on the line II—II on Fig. 1, looking in the direction of the arrow.

Figs. 3 and 4 are enlarged sectional details of parts shown in Figs. 1 and 2.

Throughout the separate views the same part is designated by the same reference character.

Referring more particularly to the drawings, 1 is the wall or bottom of the tank through which passes the inlet pipe 2. At the upper end of the inlet pipe I provide a removable valve seat 3 which is interiorly screw threaded to engage the threads of the upper end of the pipe 2. Coöperating with the valve seat 3 is a plunger valve 4 which may be of any desirable type. The valve 4 is mounted in a valve casing 5 which is screw threaded on to the lower part of the valve seat 3. A discharge pipe 6 leads the water away from the interior of the valve casing 5 and discharges the same downwardly at the lower part of the tank 1. This avoids any splashing sound when the water discharges into the tank.

7 is a standard fixed to the casing 5 and pivoted to said standard 7 is a lever 8 which extends through an eye 9 on the top of the valve 4. The lever 8 is pivotally connected to a link 10 by a pivot pin 11. 12 is a second standard fixed to the casing 5 and having pivoted thereon a lever arm 13. At the outer end of the lever 13 is a pivot 14 to which is connected a socket 15 and a rod is threaded into the member 15 at the outer end of which is a float 16. It will be seen that the socket member 15 is in two parts which can be fastened together by a screw 17 so as to adjust the normal height of the float 16 and the member 15 also carries a pin 18 which works in a slot 19 at the outer end of the arm 13, the pivot 14, pin 18 and slot 19 forming a lost motion connection between the float and the lever 13.

Branching from the pipe 2 in a pipe arm 20 to which is secured a vertical cylinder 21 and working in the cylinder 21 is a piston or plunger 22 which is subject to the pressure of the water on the inlet side of the valve 4. The piston 22 is connected to a lever 23, lever 23 being pivoted at the upper end of a third standard 24 which is also carried by the valve casing 5. The other end of the lever 23 is connected to the link 10 by the pivot pin 11, as clearly illustrated in the right hand portion of Fig. 2. This is also illustrated in Fig. 3.

It will be seen that the pressure of the water against the plunger 22 tends to close the valve 4. However, the force exerted by the piston 22 on the valve 4 is so calculated that when the water in the tank 1 has fallen sufficient to throw part of the weight of the float 16 on the lever 13, the valve 4 immediately begins to open. As the water begins to pass between the seat 3 and valve 4, the relative pressure against the valve is increased owing to the increased area of the valve thereby exposed to pressure water while the pressure against the piston 22 is correspondingly relatively decreased, so that the valve is immediately opened to its full extent by the weight of the float. On the closing movement, on the other hand, the valve remains open until the level of the water is such that the lifting pressure exerted by the float 16 on the lever 13 is sufficient to start the closing movement of the valve 4. But as soon the valve starts to close, the pressure of the water on the part of the valve 4 outside of the line of contact with the seat 3 is thereby decreased so that the pressure against the bottom of the piston 22 is immediately increased. Consequently, the piston adds further force to the closing force exerted by the float so that the closing of the valve is accelerated. The further closing of the valve, however, increases the pressure against the face of the piston so that the closing of the valve is completed ahead of the action of the float. That is to say, the action of the piston is so rapid that when the valve begins to close the lever arm 13 is thrown up out of contact with the pin 18 and the valve is held closed solely by the pressure of the water against the piston 22. Consequently, the exact level of the water in tank 1 is immaterial to the holding force on the valve 4 within certain limits and in case the flush valve is leaky, the level of the water can descend until the pin 18 strikes the lower end of the slot 19 before any leakage over the seat 3 occurs. When, however, the float begins to exert an opening pressure due to its weight, the opening movement is carried out rapidly until the valve is fully opened, since the slight opening of the valve changes the relative values of the pressures against the valve 4 and piston 22 in the reverse direction and permits the weight to accelerate the opening movement.

It is of course true that the pressure per square inch against the piston 22 decreases to some extent as the valve 4 opens and increases to some extent as the valve 4 closes. However, this change in the pressure on the piston 22 does not affect the operation of the valve in any way, since the pressure per square inch against the face of the valve 4 changes at the same time and in like amount. This fact will be apparent when it is considered that there is no aperture through the piston 22 or leading from the branch pipe in which piston 22 is mounted so that the pressure per square inch against the face of the piston 22 is always the same as the pressure per square inch at the point in the main pipe from which branch pipe 20 starts. Thus it will be seen that for the most effective operation of my device the area of the face of the valve 4 within the line of contact between the valve face and valve seat should be less than the area of the piston 22 whereas the effective area of the valve face when open should be greater than that of the piston 22.

By the arrangement just disclosed, it will be seen that the noise ordinarily made by the inlet valve of closet cisterns due to a slow opening and closing movement is entirely avoided. Moreover, leakage of water through the valve owing to slight changes in the level of water in the tank with consequent depreciation of the valve is also avoided. Nevertheless, the valve is entirely automatic in its action and requires no attention.

It will be seen, moreover, that all the parts can be made interchangeable and renewable and especially that the valve seat 3 may be renewed if required. However, the wearing parts of the valve and seat will last an unusually long time owing to the fact that the leakage is eliminated.

All the parts of the apparatus may be made of any desired material provided it is such as to give good service under water.

It will be understood that the arrangement and proportions of the various elements may be varied without departing from my invention and I desire that the claims presented herewith shall be construed broadly.

Having thus described my invention, I claim:

1. In an apparatus for governing the inlet valves of closet cisterns, in combination, an inlet valve, a float for governing the movements of said valve, mechanism intermediate said float and said valve for transmitting the motion of the float to the valve, said mechanism including a lost motion connection, a plunger subject to the pressure of the water on the inlet side of said valve and connections between said plunger and said mechanism said connections being such that the closing of the valve is completed by the water pressure alone before and independent of the final movement of the float, substantially as described.

2. In an apparatus for governing the inlet valves of closet cisterns in combination, an inlet valve, a float for governing the movements of said valve, mechanism intermediate said float and said valve for transmitting the motion of the float to the valve, said mechanism comprising an adjustable bi-partite float-carrying-member, a pin on said member, a lever secured to the valve casing, a pivot at the outer end of said lever to which said float carrying member is connected, said lever having a slot at its outer end in which said pin is working, and constituting a lost motion connection, a plunger subject to the pressure of the water on the inlet side of said valve, and connections between the said plunger and said mechanism, said connections being so arranged, that the closing of the valve is completed by the water pressure alone before and independently of the final movement of the float, substantially as described.

CHARLES W. SNYDER.